No. 619,386. Patented Feb. 14, 1899.
W. L. CALDWELL.
TWO ROW CULTIVATOR.
(Application filed Sept. 15, 1897.)
(No Model.) 2 Sheets—Sheet 1.
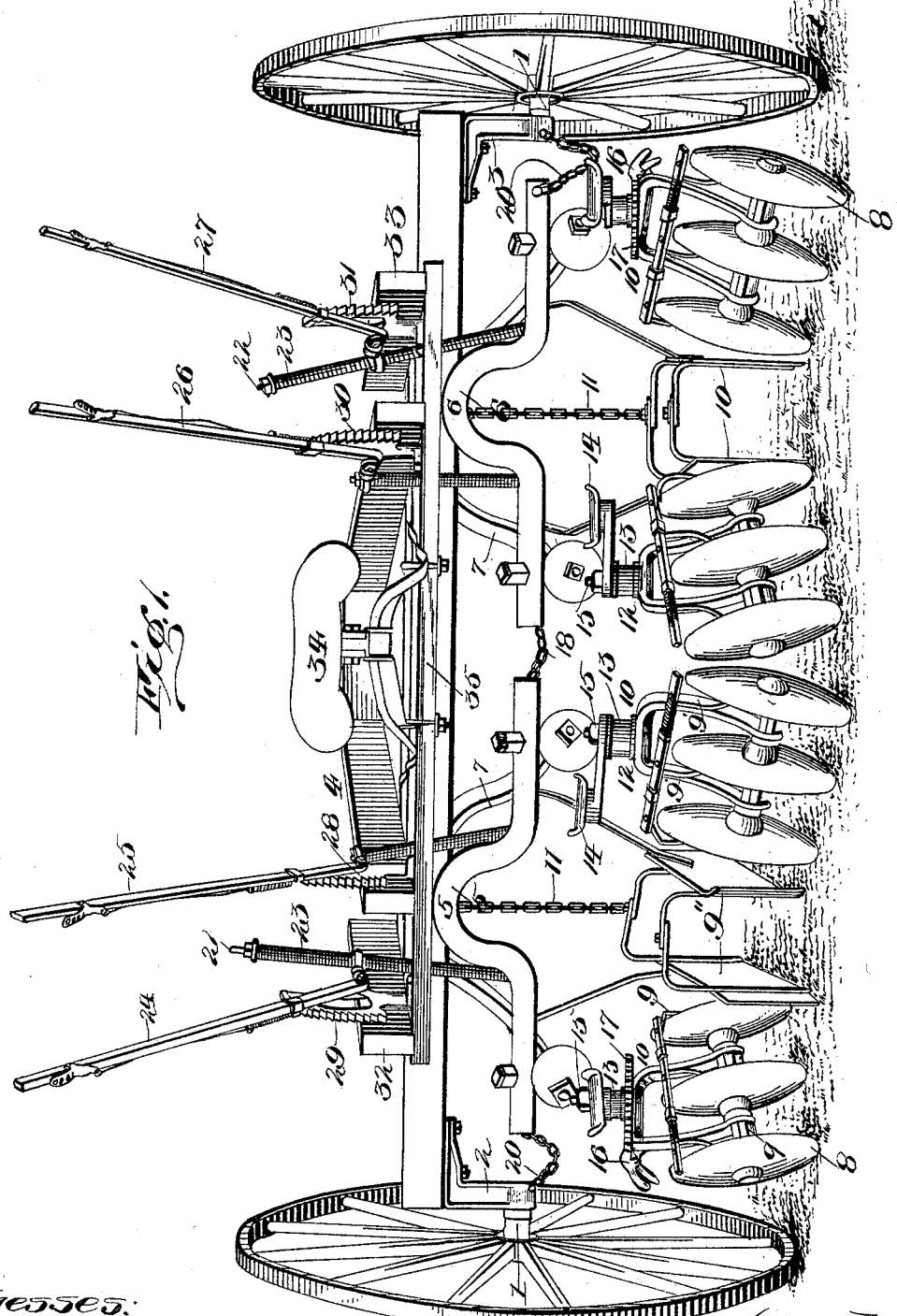
Witnesses.
J. M. Fowler Jr.
Chas T. Kramer
Inventor.
William L. Caldwell
By C. H. Maulton
Attorney

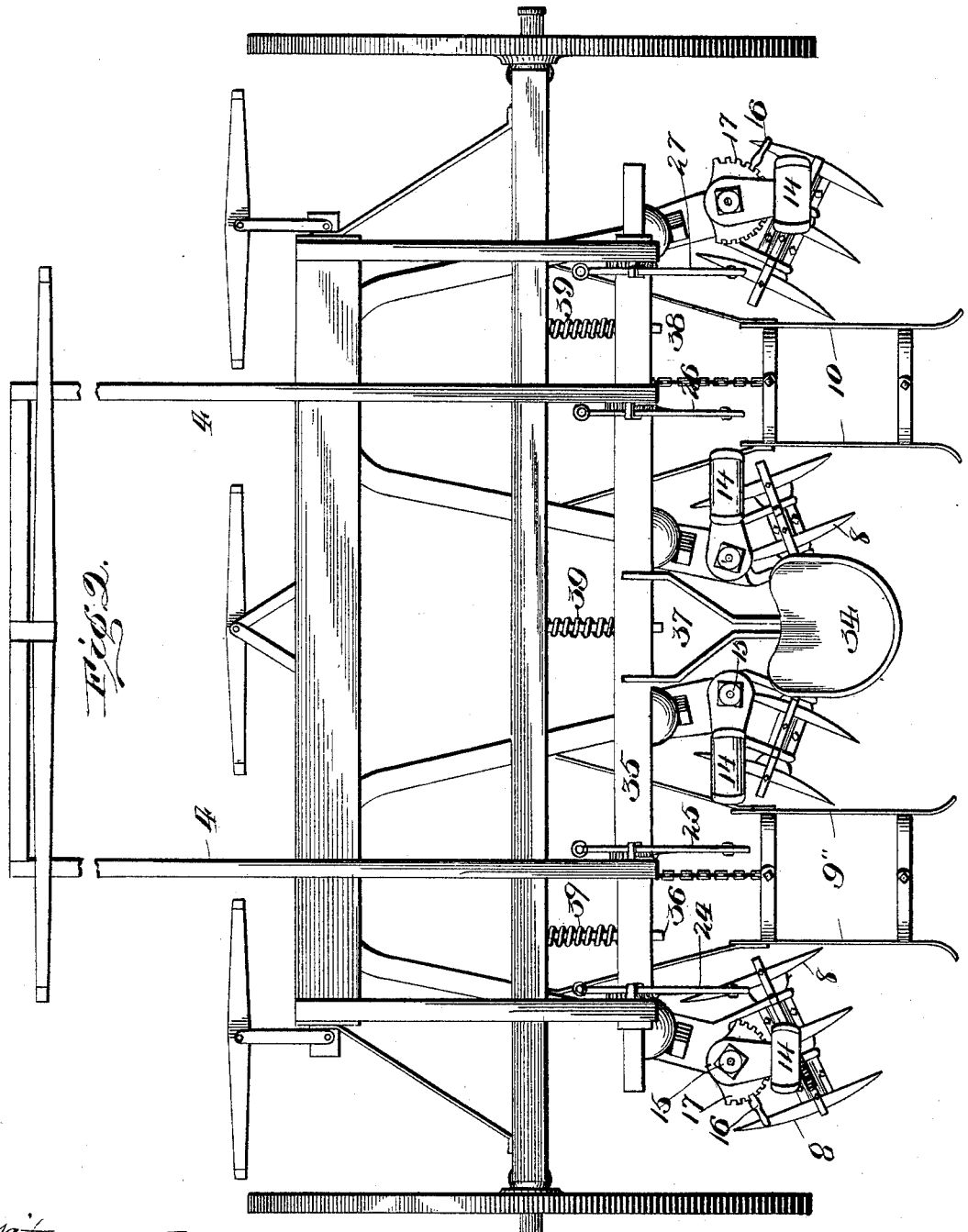

UNITED STATES PATENT OFFICE.

WILLIAM L. CALDWELL, OF NOVELTY, MISSOURI.

TWO-ROW CULTIVATOR.

SPECIFICATION forming part of Letters Patent No. 619,386, dated February 14, 1899.

Application filed September 15, 1897. Serial No. 651,742. (No model.)

*To all whom it may concern:*

Be it known that I, WILLIAM L. CALDWELL, a citizen of the United States, residing at Novelty, in the county of Knox and State of Missouri, have invented certain new and useful Improvements in Two-Row Cultivators; and I do hereby declare the following to be a full, clear, and exact description of the invention, such as will enable others skilled in the art to which it appertains to make and use the same.

The invention has relation to two-row cultivators; and it consists in the construction and novel combination of parts hereinafter fully described and claimed.

In the drawings, Figure 1 is a rear view or elevation of a two-row cultivator embodying the improvements of my invention. Fig. 2 is a top or plan view of the same.

Referring by numeral to the accompanying drawings, 1 is the axle of the machine, which is provided at its ends with crank-journals 2 and 3, upon which the supporting and riding wheels are mounted in the usual manner.

4 designates the shafts or thills between which the central animal of the three employed to draw the implement works, the two other animals being at the sides of the thills or shafts, as is usual or customary in three-horse implements of this and analogous classes. The axle 1 is preferably made of wood and iron and is of the usual pattern.

5 and 6 are arch-bars, near the ends of which the coupling-arms 7 are connected by bolts and nuts and extend rearwardly therefrom. The cultivator-disks 8 are mounted on shafts 9 in sets or groups of three and are provided each with a scraper 9', which depends from its respective foot rest or bar 10, which is connected with the frame directly above or over the cultivator-disks 8 and serves to continuously clear or clean the disks of adhering dirt. These scrapers are on the concave side of the disks, as these sides of the disks are the ones that have a tendency to clog while in use, and the scrapers automatically clean them. Between the gangs or sets of disks are the fenders 9'' and 10', which fenders straddle the rows of plants when the cultivator is being used and prevent the loosened soil and clods from being deposited or thrown against the plants, while permitting the disks to freely work the soil to free it from growing weeds. The fenders 9'' are connected with the arch-bars by chains 11 and are used only when plowing small corn and must be removed when the corn becomes tall, as the fenders would then break the corn down. The frame 12 of each set of disks is provided with a short vertical shaft 13, which is rectangular in cross-section at its upper end to receive a foot-lever 14, which is secured in place on said shaft 13 by a nut 15. When the sets or gangs of disks have been adjusted or set to the desired position, they are held to their adjustments by pivoted detents 16, which engage the teeth of the segmental gears 17 on the outer gangs or sets of cultivator-disks. The inner or adjacent ends of the arch-bars 5 and 6 are connected together by a chain 18, and their outer ends are connected to the journal-cranks 2 and 3 of the main axle by chains 20, and it serves to regulate and equalize the draft and distribute it throughout the implement. Rising from the arch-bars 5 and 6 are rods 21 and 22, which are encircled by coiled springs 23 and are connected with the weight ends of levers 24, 25, 26, and 27, which are fulcrumed to the inside faces of arc-racks 28, 29, 30, and 31, secured to the frame of the machine, preferably to the rearwardly-diverging bars 32 33 of the frame of the machine, within convenient reach of the driver while occupying the driver's seat 34, which is secured to the rear cross-beam 35 of the frame of the machine. The cross-beam 35 is supported on short rods 36, 37, and 38, which extend rearwardly from the axle of the machine and are encircled by coiled springs 39, which normally press rearwardly and serve to relieve the necks of the animals used to draw the machine from the shock, jar, or strain that would come upon them were the spiral or coil springs not used. These springs 39 also serve to relieve the machine itself of considerable of the strain or shock that is unavoidably imparted to it when the machine is being used, so that the driver, as well as his team, is relieved of a great deal of unnecessary jar and shock. The segmental gears provided for the two outer sets of disks or plow-points permit them to be set at divers angles to suit the wishes of the operator and the work he is desirous of performing. When taken in connection with the accompanying drawings, the foregoing description will enable persons at all familiar with the class of machines to which this invention belongs to construct and operate the same.

A suitable tool-box may be mounted on any convenient part of the frame where it will be easily accessible.

Minor changes in the details of the structure may be made within the scope of the invention without departing from the spirit or sacrificing any of the advantages thereof.

Although I have illustrated and described cultivator-disks in connection with this machine, it is my purpose to use, and I do use in place of the disks, which I remove from the cultivator, plows or cultivators of any desirable or convenient make or pattern, and they may be adjusted, raised and lowered, and guided in a manner similar to or the same as the disks when the latter are in place, so that I do not confine myself to the disks alone, but may use cultivators or plows instead. It should be noted that the fenders are also to be used when plows or cultivator-teeth are employed in cultivating young plants and that the fenders are only to be removed and dispensed with when the plants have grown too large to permit the fender to be used.

Having thus fully described my invention, what I claim, and desire to secure by Letters Patent, is—

1. The combination with the frame having the auxiliary or cross beam, and the arch-bars connected by a chain to each other at their inner or adjacent ends, and connected by chains at their outer ends to the cranks of the axle, of the vertically-disposed rods encircled by spiral springs, the levers connected with the encircling springs on said rods and provided with spring-actuated pawls and detents and fulcrumed to arc-racks secured to the upper portion of the frame of the machine.

2. The combination with the frame having the auxiliary or cross beam, rods 36, 37 and 38 secured to and extending from the axle through said beam, springs 39, encircling said rods, and the arch-bars connected by a chain to each other at their inner or adjacent ends, and connected by chains at their outer ends to the cranks of the axle, of the vertically-disposed rods encircled by spiral springs, the levers connected with the encircling springs on said rods and provided with spring-actuated pawls and detents and fulcrumed to arc-racks; of the cultivator-disks mounted on shafts and disposed in groups or gangs, foot rests or bars, scrapers depending from said foot rests or bars, foot-levers secured to the disk-shafts, nuts for securing said foot-levers, segmental gears, detents engaging the same for adjusting the gangs of disks, and adjustable fenders, chains for securing said fenders to the arch-bars.

In testimony whereof I have affixed my signature in presence of two witnesses.

WILLIAM L. CALDWELL.

Witnesses:
F. M. MILLER,
L. F. COTTE.